United States Patent [19]

Schröder et al.

[11] Patent Number: 4,638,234

[45] Date of Patent: Jan. 20, 1987

[54] APPARATUS FOR PERFORMING REMOTELY-MANIPULATED MAINTENANCE ON PARTS OF EQUIPMENT IN A SHIELDED NUCLEAR FACILITY

[75] Inventors: Günter Schröder, Minden-Dützen; Helmut Berning, Bochum, both of Fed. Rep. of Germany

[73] Assignee: Deutsche Gesellschaft für Wiederaufarbeitung von Kernbrennstoffen mbH, Hanover, Fed. Rep. of Germany

[21] Appl. No.: 779,385

[22] Filed: Sep. 23, 1985

[30] Foreign Application Priority Data

Sep. 22, 1984 [DE] Fed. Rep. of Germany ....... 3434934

[51] Int. Cl.$^4$ .............................................. G05B 1/06
[52] U.S. Cl. .................... 318/661; 318/568; 901/16
[58] Field of Search .............. 318/568 H, 568 D, 661, 318/568; 901/16

[56] References Cited

U.S. PATENT DOCUMENTS 4,283,764 8/1981 Crum ........................ 318/568 H
4,408,286 10/1983 Kikuchi et al. ................ 318/568 D
4,562,391 12/1985 Inoue ............................. 318/568 D Primary Examiner—Benjamin Dobeck
Attorney, Agent, or Firm—Walter Ottesen

[57] ABSTRACT

The invention relates to a remotely-operable remote handling arrangement for use in radioactively loaded large-area cells of facilities containing process equipment for reprocessing irradiated nuclear fuels. The remote handling apparatus has an industrial robot which is controlled by a process computer and which, for the purpose of detecting the position of an arm of an articulated joint of the robot, is provided with a rotary sensor for determining the angular position of the arm. The rotary sensor is configured as a resolver and is configured pursuant to the induction principle. A second resolver is arranged coaxially with respect to the first resolver in order to be able to check the true position of the arm of the joint. On its shaft, the second resolver has a suitable indicator which is rotatable with the shaft relative to a zero mark. The true position of the shaft of the first resolver and thus the true position of the monitored arm is detected by a scan from the zero mark to an indicator on the shaft of the first-mentioned resolver.

8 Claims, 4 Drawing Figures

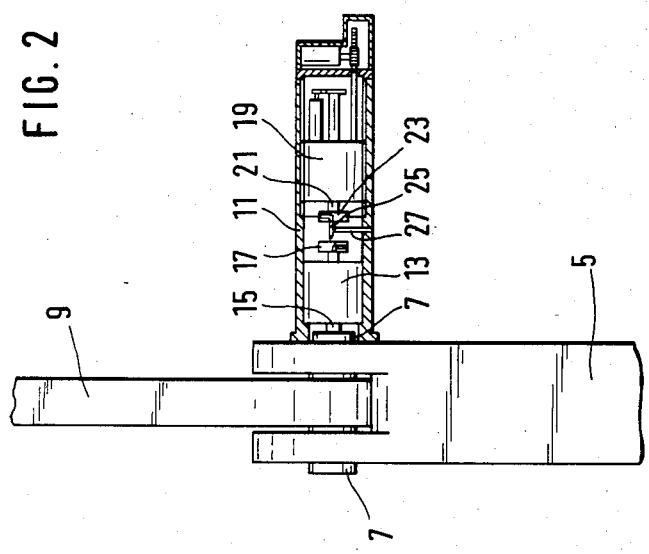
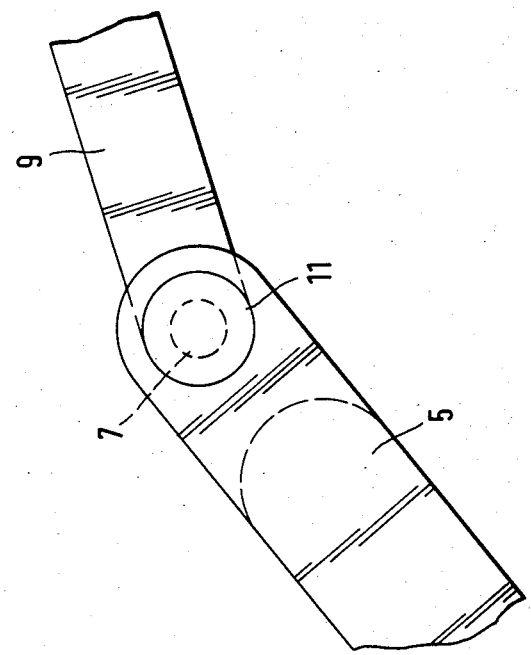

APPARATUS FOR PERFORMING REMOTELY-MANIPULATED MAINTENANCE ON PARTS OF EQUIPMENT IN A SHIELDED NUCLEAR FACILITY

FIELD OF THE INVENTION

The invention relates to a remotely-operable handling apparatus for use in large-area, radioactively-charged process cells of facilities for reprocessing irradiated nuclear fuels. The handling apparatus includes an industrial robot controlled by means of a process computer. The industrial robot has an articulated joint connecting two joint arms together. An angle sensor detects the angular position of the joint arm and is configured according to the induction principle.

BACKGROUND OF THE INVENTION

Installations for reprocessing irradiated nuclear fuels have what are referred to as large-area hot cells for accommodating the process components. The process components are set up in supports or structures known as racks within the large-area radiation-shielded cells.

Maintenance operations within the large-area radiation-charged cell should be carried out as far as possible without the necessity of operating personnel entering the cell. Accordingly, it has been proposed that maintenance operations should be carried out by portable remote-handling machines.

It has previously been suggested that manipulator carrier systems should be provided which act in the horizontal direction from a central path of the hot cell on the process components. A manipulator carrier system of that kind affords the possibility of using electrical servo and power manipulators as well as robots and programmable devices.

The use of a robot in the radioactively loaded cell hitherto involved difficulties because the angle encoding means thereof failed under the effects of the radioactivity. Angle encoding means detect the information signals by way of optical image patterns. Angle encoding means of that kind cannot operate effectively in the field of radiation because the semiconductor components are affected by the radiation and can therefore produce faulty information.

It has therefore already been proposed that, instead of the angle encoding means, resolvers should be used as rotary sensors which provide for electromagnetic pulse counting. The information signals are then obtained by induction. The resolver is at a defined zero point at the beginning of the counter operation.

Resolvers induce information signals in a coil, and such information signals, after a counting operation, identify the position of the associated moved robot joint arm. In this connection, reference can be made to published German patent application DE-OS No. 24 28 573. However, when, for example, a robot is in the switched-off condition, there may be a change in the position of the corresponding joint arm because of the force of gravity pulling the arm downwardly. In the switched-off condition, the joint arm then changes from the position which was last detected and which remains stored in the computer as the actual position thereof. Now, after the robot is switched on, the position of the joint arm is different from that which is known to the computer. The resolver and the counter are no longer matched to the zero point of the joint arm. A counting operation now produces faulty information and not the actual position or location of the joint arm.

This disadvantageous displacement of the robot joint arm relative to the zero counting point, once it has been set, can also occur during operation.

German published and examined patent application DE-AS No. 24 42 865 discloses an arrangement wherein the accuracy of adjustment thereof is independent of load and wear. This arrangement has a disc which carries abutments and which is non-rotatably but axially displaceably mounted. A robot is disclosed in German published patent application DE-OS 28 31 361 which is equipped with return means fitted with two abutments. The abutments represent a defined rest position.

Also, published German patent application DE-OS No. 30 45 984 discloses a programmable manipulator.

SUMMARY OF THE INVENTION

It is an object of the invention to configure a remote handling apparatus of the kind described above in such a way that information is always available by means of which changes in position and deviations from the condition of the joint arm, which is known to the computer, can be detected.

According to a feature of the invention, the shaft of the resolver is rotatable with the drive shaft of the robot joint and the drive shaft is non-rotatably connected to the joint arm to be monitored. Also, the drive shaft of the joint is rotatably journalled in the other joint arm of the robot joint and a zero mark is fixedly disposed on the last-mentioned joint arm. A second resolver is arranged in coaxial relationship with the shaft of the first resolver and the second resolver, on its shaft, has a suitable means which is rotatable with the shaft relative to the zero mark. The second resolver, with its means on the shaft, is movable relative to appropriate means on the shaft of the first resolver.

The second resolver is only moved into close proximity with the shaft of the first resolver for the purpose of checking the true situation of the joint arm to be monitored. Then, the second resolver travels from a zero point on the joint arm selected as reference toward a zero mark on the shaft of the first resolver. During this movement, the altered position of the other joint arm or the main resolver, relative to the zero mark on the reference joint arm, can be counted off by means of the second resolver. In that way, the true position of the other joint arm can be indirectly checked. That counting information is fed to the computer. Then, in further operation of the robot, the true starting position of the main resolver can be taken into consideration by the computer.

By way of a desired to actual comparison of this kind, the actual position of the other joint arm is available as an item of information. Further operation can thus take place without disturbance. This control using the second resolver can be carried out as often as may be desired, that is, including while the robot is in operation. It is therefore possible to provide for continuous monitoring as to whether the position detected and indicated by the instruments is really the true position.

After the particular measurement operation, a motor rotates the monitoring resolver back to its zero position via its shaft.

The invention can be utilized irrespective of whether the first resolver is arranged in coaxial relationship with the drive shaft of the robot joint or is disposed outside the axis of the shaft because of a lack of space. In the second case, the rotary movement of the drive shaft is transmitted to the resolver by means of toothed belts in a manner known per se. In this embodiment also and pursuant to the invention, the monitoring resolver is arranged in coaxial relationship with the first resolver.

The invention makes it possible to use industrial robots in hot cells and to control them by means of process computers, so that working operations are made less expensive, more reliable and safer.

BRIEF DESCRIPTION OF THE DRAWING

The invention will now be described with reference to the drawing wherein:

FIG. 1 shows a joint connecting two arms of an industrial robot which are pivotable relative to each other;

FIG. 2 shows a side view of FIG. 1, with a portion cut away to show an elevation view of a measuring apparatus containing two resolvers for obtaining angular information;

DESCRIPTION OF THE PREFERRED EMBODIMENTS OF THE INVENTION

Figure 3:
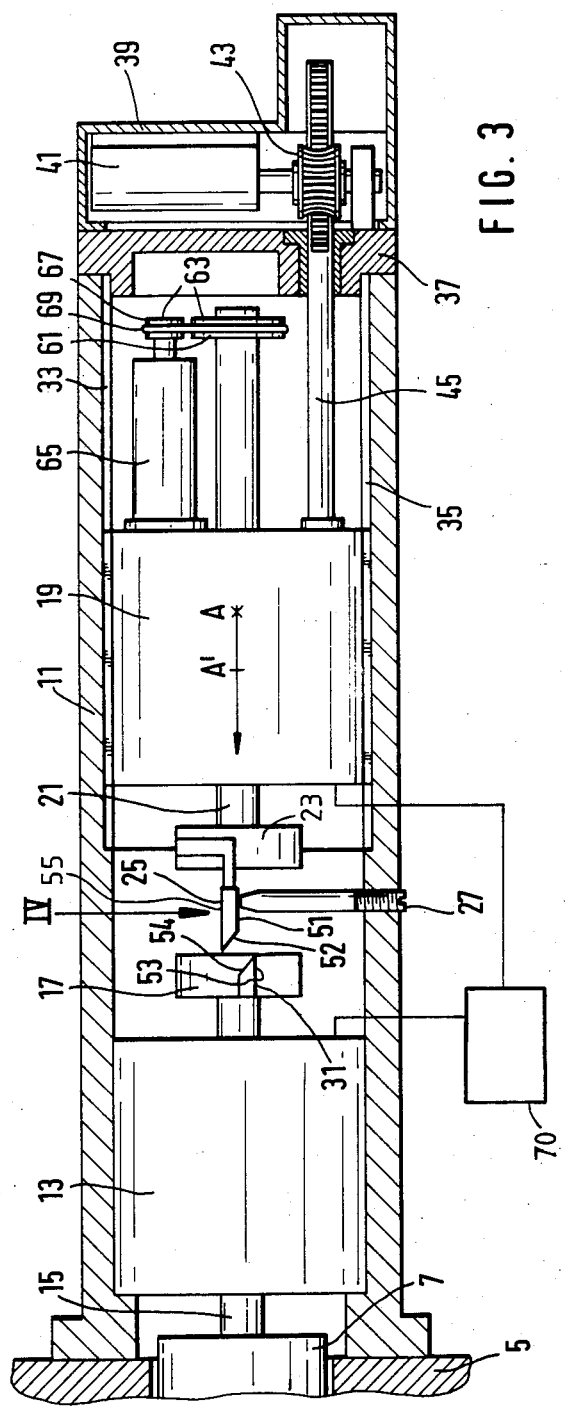
FIG. 3 is an enlarged view, partially in section, of the measuring apparatus of FIG. 2 and illustrates details thereof; and, FIG. 4 is a detail view of a portion of FIG. 3 in the direction of the arrow IV of FIG. 3.
Figure 4:
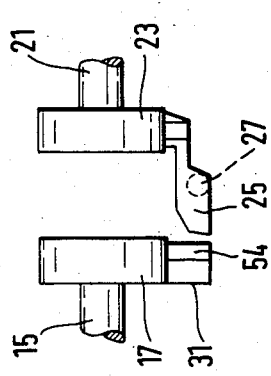

The robot joint shown in FIGS. 1 and 2 has a joint arm 5 which, at its end, is connected to another joint arm 9 by means of a drive shaft 7 in such a way that the two arms are pivotable relative to each other. The drive shaft 7 is non-rotatably connected to the arm 9 and is rotatably journalled in bores in the end of the arm 5.

A housing 11 (see FIG. 2) is secured to the joint arm 5 in which a first resolver 13 is mounted, the resolver 13 being the main resolver. The shaft 15 of the main resolver 13 is non-rotatably coupled to the drive shaft 7 of the arm 9. A pointer or indicator hub 17 is positively fixed on the other end of the shaft 15 of the main resolver 13.

A second resolver 19 is mounted in the housing 11 and is the control resolver. The resolver 19 is in coaxial relationship with the main resolver 13. At one end, which faces toward the main resolver 13, the shaft 21 of the control resolver 19 has an indicator hub 23 carrying a pointer 25. In the rest position, the pointer 25 is supported on an adjustment pin 27 which is threadably connected to the housing 11.

In FIG. 3, the housing 11, which is flange-connected to the joint arm 5, is shown in section and in an enlarged scale to provide greater clarity. The housing 11 is flange-connected to arm 5 so as to be in coaxial relationship with the joint shaft 7.

The main resolver 13 is fixed in the housing 11. The shaft 15 of resolver 13 is non-rotatably coupled to the drive shaft 7 at one end thereof. Secured at the other end of the shaft 15 of the main resolver 13 is the pointer hub 17 which rotates with the shaft 15. The hub 17 has a pointer 31. The position of the pointer 31 corresponds to the particular position of the drive shaft 7 of the joint and thus the position of the joint arm 9 relative to the joint arm 5 which serves as a reference arm.

The second resolver 19 is displaceably mounted in coaxial relationship with the main resolver 13 in two diametrically opposite axis-parallel guide slots 33 and 35 in the housing 11. The second resolver 19 is the control resolver for determining the deviation of the position of the joint arm 9 from the displayed position.

The housing 11 is closed by a cover 37 at the housing end which is opposite to the joint. A smaller housing 39 is flange-connected to the cover 37. An electric motor 41 is mounted in housing 39 which can displace a threaded spindle 45 by means of a pinion 43. The threaded spindle 45 is slideably mounted in the cover 37. The threaded spindle 45 is secured to the control resolver 19 so that the resolver 19 can be displaced in the guide slots 33 and 35 upon displacement of the spindle 45.

The shaft 21 which passes through the control resolver 19 is provided at its end adjacent the main resolver 13 with the pointer hub 23 which carries the pointer 25. The pointer 25 lies with a lower contact surface 51 on the adjustment pin 27 which is threadably connected to the housing 11. The pointer 25 has an inclined slide surface 52. The pointer 31 on the pointer hub 17 of the main resolver 13 also has an inclined slide surface 54. The slide surfaces 52 and 54 are inclined in opposite directions to each other.

The pointer 31 is equipped with a measuring contact surface 53 which coacts with a measuring contact surface 55 of the pointer 25.

Mounted on the other end of the shaft 21 on the control resolver 19 is a drive wheel 61 for a cord drive 63 having an electric motor 65 which is mounted on the control resolver 19. The output shaft of the electric motor 65 has a drive wheel 67 which is connected by means of a cord 69 to the drive wheel 61 of the control resolver 19. A rotary motion is transmitted to the shaft 21 by means of the cord drive 63.

The mode of operation of the above-described arrangement is described below.

In the operation of the robot, the joint shown in FIG. 1 is sensed by the first resolver 13, and in that way information is obtained about the position of the joint arm 9 relative to the joint arm 5. In this connection, the position of the pointer 31 of the pointer hub 17 corresponds to the particular position of the drive shaft 7 of the joint. The joint arm 5 is fixedly connected to the housing 11 and serves as a reference arm.

For the purposes of a control measurement of the true position of arm 9, the motor 41 is actuated and the control resolver 19 is moved by means of the threaded spindle 45 from position A into position A'. The pointer 25 which is mounted on the shaft 21 and which in the rest position bears with its contact surface 51 on the adjustment pin 27 becomes free and, for the purposes of carrying out the control measurement operation, is rotated by the motor 65 by means of the cord drive 63 and the shaft 21 in the clockwise direction (viewing in the direction from A towards A') about the pointer hub 31 of the main resolver 13 until the two contact surfaces 53 and 55 of the respective pointers 31 and 25 touch. The rotary movement is performed by the pointer hub 23 of the control resolver 19 until contact is made and this rotary movement is the result of the control measurement. Information signals are produced in the control resolver 19 by means of the rotary movement and are passed to the computer 70. In the computer, those information signals are compared to the signals produced by resolver 13, and deviations are determined.

In the event that the pointer 31 has a position during a control which lies approximately opposite the pointer 25, then the inclined slide surfaces 52 and 54 run upon each other when the control resolver is moved to the left. As a consequence, the pointer 25 is already rotated in the clockwise direction when the slide surfaces 52 and 54 run upon each other. This commencing of rotation is detected by the control resolver 19 and counted out. This configuration prevents a dead range in the measuring arrangement.

The cord 69 which is used in the cord drive 63 is slightly pretensioned so that, after the pointers 25 and 31 touch, the torque of the motor 65 is discontinued.

After the conclusion of the control measurement and the processing of the counting information, the shaft 21 of the control resolver 19 is rotated back somewhat. The control resolver 19 is then moved back from position A' to position A shown in the drawing by displacement of the threaded spindle 45. The shaft 21 of the resolver 19 is rotated by means of the motor 41 until the pointer 25 with the contact surface 51 again comes into contact with the adjustment pin 27. The control resolver 19 is again in the starting position, the latter being its zero point position.

It is understood that the foregoing description is that of the preferred embodiments of the invention and that various changes and modifications may be made thereto without departing from the spirit and scope of the invention as defined in the appended claims.

What is claimed is:

1. In a remotely-operable handling arrangement for use in a radioactively-loaded large-area cell of a facility for processing irradiated nuclear fuel, the arrangement including an industrial robot having a robot joint connecting two arms, a process computer for controlling the robot and an apparatus for monitoring the position of one of the arms of the robot joint, the apparatus comprising:

a first resolver for sensing the angular position of said one arm relative to the other one of said arms;
   said robot joint having a drive shaft fixedly attached to said one arm and rotatably journalled in said other one of said arms;
   said first resolver having a first shaft connected to said drive shaft so as to be rotatable therewith;
   first contact engaging means arranged on said first shaft;
   zero mark means fixedly mounted on said other arm;
   a second resolver mounted coaxially to said first shaft for ascertaining the true position of said one arm, said second resolver having a second shaft;
   second contact engaging means mounted on said second shaft for engaging said zero mark means when said second shaft is rotated thereby defining the rest position; and,
   drive means for rotatively driving said second shaft so as to bring said second contact means from said rest position into contact engagement with said first contact engaging means thereby providing an indication of the true position of said one arm.

2. The apparatus of claim 1, said first shaft being arranged coaxially to said drive shaft and being non-rotatably connected thereto.

3. The apparatus of claim 1, comprising:
   a housing fixedly attached to said other arm;
   said first resolver and said second resolver both being inductive resolvers and being mounted in said housing so as to be coaxial with respect to each other;
   said zero mark means being an adjustable pin threadably engaged with said housing;
   said first contact engaging means including a hub mounted on said first rotor shaft so as to be adjacent said second hub; and, a first indicator mounted on said first hub; and,
   said second contact engaging means including a second hub mounted on said second rotor shaft so as to be adjacent said first hub and a second indicator mounted on said second hub.

4. The apparatus of claim 3, said indicator having respective slide surfaces, said slide surfaces having respective slopes directed in mutually opposite directions, said indicators further having respective contact surfaces facing each other.

5. The apparatus of claim 3, said resolvers having a common longitudinal axis, said apparatus further comprising axial drive means for driving said second resolver along said axis so as to permit said first and second contact engaging means to mutually coact.

6. The apparatus of claim 5, said axial drive means comprising guide slots formed in the inner wall of said housing for guiding said second resolver therealong; an electric motor mounted in said housing and threaded spindle means operatively interconnecting said second resolver and said electric motor thereby permitting said electric motor to drive said second resolver along said slots.

7. The apparatus of claim 1, comprising electric motor means for rotatively driving said second rotor shaft.

8. The apparatus of claim 7, said electric motor means including an electric motor mounted on said second resolver and a drive belt for transmitting the output torque of said motor to said second rotor shaft.

* * * * *